United States Patent
Tellenbach et al.

(10) Patent No.: US 7,478,551 B2
(45) Date of Patent: Jan. 20, 2009

(54) MODULAR CALIBRATION WEIGHT

(75) Inventors: Jean-Maurice Tellenbach, Hettlingen (CH); Urs Loher, Widen (CH); Richard Bruderer, Winterthur (CH)

(73) Assignee: Mettler-Toledo AG, Greifensee (CH)

( * ) Notice: Subject to any disclaimer, the term of this patent is extended or adjusted under 35 U.S.C. 154(b) by 377 days.

(21) Appl. No.: 11/306,883

(22) Filed: Jan. 13, 2006

(65) Prior Publication Data
US 2006/0196706 A1 Sep. 7, 2006

(30) Foreign Application Priority Data
Jan. 26, 2005 (EP) .................................. 05100476

(51) Int. Cl.
*G01G 23/01* (2006.01)
(52) U.S. Cl. ................. 73/1.13; 73/1.15; 177/50; 177/212; 177/229; 177/264
(58) Field of Classification Search .................. 73/1.13, 73/1.15; 177/50, 212, 210 EM, 229, 264
See application file for complete search history.

(56) References Cited

U.S. PATENT DOCUMENTS

| 70,531 | A | * | 11/1867 | Comstock | 177/264 |
|---|---|---|---|---|---|
| 209,434 | A | * | 10/1878 | Tuttle | 177/264 |
| 447,136 | A | * | 2/1891 | Mott | 177/264 |
| 788,074 | A | * | 4/1905 | Stoelting | 177/264 |
| 2,681,222 | A | * | 6/1954 | Stelzer | 177/168 |
| 2,689,747 | A | * | 9/1954 | Kolbe | 280/124.103 |
| 6,194,672 | B1 | | 2/2001 | Burkhard | |
| 6,232,567 | B1 | | 5/2001 | Bonino | |
| 6,414,252 | B1 | | 7/2002 | Emery | |
| 6,583,370 | B2 | * | 6/2003 | Stoneberg | 177/264 |
| 6,864,437 | B2 | * | 3/2005 | Weber | 177/50 |
| 2004/0050594 | A1 | * | 3/2004 | Tobey | 177/128 |

FOREIGN PATENT DOCUMENTS

| EP | 0 020 030 A1 | 12/1980 |
|---|---|---|
| JP | 01-152318 | 6/1989 |
| JP | 2002-168683 | 6/2002 |

* cited by examiner

*Primary Examiner*—Randy W Gibson
(74) *Attorney, Agent, or Firm*—Standley Law Group LLP

(57) ABSTRACT

A calibration weight 100 for a gravimetric measuring instrument includes a calibration weight base module 101 which is equipped with at least one attachment area 106. The calibration weight 100 further has at least one positioning means 104 and at least one transfer element 105. The attachment area 106 allows supplemental weights 102 to be built onto the calibration weight base module 101; the positioning means 104 serves to position the calibration weight 100 in relation to the calibration weight arm 20; and the transfer element 105 serves as the place through which the transfer mechanism lever 31 applies its force and effects a transfer.

20 Claims, 3 Drawing Sheets

MODULAR CALIBRATION WEIGHT

TECHNICAL FIELD

The present invention relates to a calibration weight for a gravimetric measuring instrument, in particular for a balance.

BACKGROUND OF THE ART

To control the sensitivity of a balance, it is an established procedure that from time to time an accurate calibration weight is put on the balance and weighed, and that correction factors are determined based on the weighing result. The known state of the art also includes balances that have a built-in calibration weight which, when necessary, can be coupled to the load-receiving part of the weighing mechanism in the manner of a weight that is operated by a dial selector mechanism.

If the calibration weights are put directly on the load-receiving part, the mass as well as the volume of the calibration weights will correspond directly to the capacity load of the balance and will therefore be large. The mass and volume of the calibration weight can be reduced if a lever mechanism is arranged between the calibration weight and the load-receiving part, whereby the force generated by the calibration weight is transferred to the load-receiving part through a lever reduction.

A balance of this type, which operates according to the principle of electromagnetic force compensation and has a built-in rod-shaped calibration weight, is disclosed in U.S. Pat. No. 6,194,672 B1 to Burkhard et al., which is owned by the applicant. As the calibration weight arm is permanently coupled to the load-receiving part, it only serves to receive the calibration weight during the calibration process and is not part of the calibration weight itself.

A weighing cell which likewise operates according to the principle of electromagnetic force compensation is disclosed in U.S. Pat. No. 6,232,567 B1 to Bonino et al., also owned by the applicant. It has a calibration weight receiver that is permanently screwed to the load-receiving part. The calibration weight receiver is configured so that it can receive a calibration weight from a non-disclosed calibration-weight-holding mechanism.

A calibration device for a weighing cell is disclosed in European patent application 0 020 030 A1. The weighing cell is of a state-of-the-art configuration and has a load-receiving part and a stationary part. A calibration weight arm is permanently connected to the load-receiving part. Two pairs of bolts are rigidly connected to the calibration weight arm and serve as calibration weight receivers for two weights which can be set onto the bolt pairs independently of each other, either each weight individually or both weights simultaneously, for the purpose of checking and calibrating the weighing cell. When the two weights are not seated on the bolt pairs to perform a calibration, they are secured by means of angled levers and abutments in a vertical support plate which is connected to the stationary part of the weighing cell through support elements.

A weighing cell with strain gauges is disclosed in commonly-owned U.S. Pat. No. 6,414,252 B1 to Emery et al., which has a cylindrical calibration weight on a U-shaped calibration weight arm. The calibration weight arm is part of a lever mechanism to transmit and amplify the calibration weight force acting on the load-receiving part of the weighing cell and remains rigidly connected to the load-receiving part also while the weighing is taking place.

Another weighing cell with strain gauges is disclosed in Japanese patent application 2002-168683 A, which has a calibration weight with a reduction lever, where the reduction lever and the calibration weight are used for calibration as well as for dead-weight compensation. Several block-shaped calibration weight pieces are rigidly connected to the reduction lever. The calibration weight and the reduction lever in this arrangement form a unit and, unlike the devices of the aforementioned patents and publications, they cannot be uncoupled from each other. By shifting the fulcrum point of the reduction lever by means of a lifting device, one of the two functions of calibrating or dead-weight compensation is selected. Thus, the dead-weight compensation weight or calibration weight remains constantly in interactive connection with the weighing cell.

Calibration weights, in particular the kind of calibration weights whose weight force is transmitted to the load-receiving part through a lever-reduction mechanism, need to take a defined, reproducible position in relation to the calibration weight arm on which the weight is set in the calibration process. The defined, reproducible position is achieved through appropriate positioning means that are located on the calibration weight and enter into engagement with a correspondingly configured position-defining seating area on the calibration weight arm. In most cases, the calibration weight is in addition provided with specially configured transfer means which also position the calibration weight in relation to a transfer mechanism which has the function of setting the calibration weight on the calibration weight arm and lifting it off. No wear or exchange of material can be allowed to take place at the places of contact between the calibration weight and the calibration weight arm, or between the calibration weight and the transfer mechanism. To prevent that a calibration weight gains mass over its useful lifetime, one uses materials whose surfaces will, as much as possible, not oxidize, or materials with a surface on which a dense, stable oxide layer forms spontaneously already during the time immediately after the machining of the piece and before it is being used.

The accuracy of a balance depends substantially on the load capacity and the resolution of the weighing cell. This has the consequence that model series of balances are developed with a stepwise progression of load ranges from one model type to the next. It is advantageous if the mass of the calibration weight is matched to the upper limit of the load range, i.e., to the capacity load of the balance, in order to keep the error of the correction value and, accordingly, the influence of this error on the weighing result as small as possible. Consequently, every balance type in the series has its own calibration weight, matched to the weighing cell and its capacity load. The size of the balance housing is in this case determined by the required design space. If the design objective calls for a series of balance types with different load ranges using the same housing, then the size of the housing is determined by the largest load range, particularly if weighing cells are used that are not equipped with a lever mechanism for the reduction of the calibration weight force. Using separate designs for different load ranges leads to a large number of different calibration weights and thus to small production numbers. Depending on the configuration of the calibration weights and the weighing cells that are being used, it will further be necessary to produce different calibration weight arms. In the interest of economy, one will therefore choose the simplest possible shapes for the calibration weights, for example cylindrical shapes, which are made of one piece in order to avoid additional costs for assembling them. In conclusion, the disadvantages of the calibration weights disclosed in the prior art are in the spatial requirements imposed by the need to choose a simple shape, and the requirement for a large diversity of calibration weights for use in different gravimetric measuring instruments, in particular different balance types in a design family or model series of balances.

At least the exemplary embodiments of the present invention therefore have the objective to provide a calibration weight of the type that can be set on a calibration weight arm with a design that allows the calibration weight to be used in a diversity of differently built gravimetric measuring instruments, in particular in the different balance types in a design family of balances.

SUMMARY OF THE INVENTION

The foregoing objective is met by the features of the appended claims. A calibration weight for a gravimetric measuring instrument, in particular a balance, with a weighing cell that has a load-receiving part and a stationary part has a calibration weight base module on which at least one attachment area is formed for attaching at least one supplemental weight. The gravimetric measuring instrument is further equipped with a transfer mechanism whereby the inventive calibration weight can be coupled to as well as uncoupled from a calibration weight arm that is connected to the load-receiving part of the weighing cell.

With preference, the mass of the calibration weight base module is matched to the capacity load of the balance type which has the smallest load range of a balance model series.

Depending on the design configuration of the weighing cell that is being used and the available design space inside the balance housing, a calibration weight base module can be given a rod-shaped, U-shaped, H-shaped, Y-shaped, ring-shaped, or cup-shaped configuration. Variations of U-shapes, ring-shapes and cup-shapes with multiple corners and edges are also possible. Circular rings and oval shapes with cross-sections of any desired shape are likewise possible.

The attachment areas and fastening means ensure a durable connection of supplemental weights to the calibration weight base module. The generic category of the fastening means or attachment areas encompasses not only form-fitting releasable or non-releasable connector elements such as screws, pins, rivets, bolts, heat-shrink tubing and the like, but also projections, pockets, lugs, bore holes and recesses that are formed on the calibration weight base module. Even displacement-limiting linear guides and the like are suitable as fastening means or attachment areas. The supplemental weights can furthermore be durably connected to the calibration weight base module at appropriately designed attachment areas by clamping, wedging, snapping, forging, adhesive bonding, soldering, welding, recasting, pressing, shrink-fitting and similar techniques used in the sense of an attachment means.

During a calibration process, it is critical for the calibration weight to be correctly positioned on the calibration weight arm. For this purpose, at least one positioning means is provided which works together with at least one corresponding position-defining seating area on the calibration weight arm. Elements that can be used as positioning means include pins, bolts, lugs, bore holes, recesses, linear-guiding constraints, as well as projections and surfaces of spherical, conical or cubic shape with a high coefficient of friction.

With preference, the calibration weight base module therefore has at least one positioning means rigidly connected to it, which serves to position the calibration weight base module in relation to at least one position-defining seating area which is formed on the calibration weight arm. Of course, the positioning means can also be formed on the calibration weight arm and the position-defining seating area can be formed on the calibration weight base module. If a supplemental weight is connected to the calibration weight base module, the supplemental weight can likewise have one or more positioning means of position-defining seating areas. As the positioning means is in contact with the calibration weight arm at the position-defining seating areas, the positioning means needs to have a wear-resistant surface which does not allow an exchange of material at the places of contact.

The positioning means performs its function during the calibration process wherein the positioning means in cooperation with the position-defining seating areas on the calibration weight arm positions the calibration weight in a play-free manner in relation to the load-receiving part of the weighing cell within a plane that is orthogonal to the calibration load direction. It is irrelevant for this function whether only one positioning means performs the positioning within the plane and simultaneously serves as a seat or whether the positioning and seating functions are achieved through a plurality of positioning means that are rigidly connected to the calibration weight base module. According to the invention, only one positioning means, and consequently only one position-defining seating area, is necessary if the seating area is a surface that lends a sufficient degree of stability to the calibration weight in relation to the calibration weight arm during the calibration process. If the center of gravity of the calibration weight is located below the positioning means, it would also be sufficient to use only one positioning means with a point-shaped seating contact, for example a hook. In this case, the positioning means puts the calibration weight into a hanging position on the position-defining seating area, for example a recess in the calibration arm.

For rotationally symmetric calibration weight modules, it is sufficient to have two positioning means. In the case of asymmetric calibration weight modules, at least three positioning means are required in order to achieve a stable, defined position of the calibration weight in relation to the calibration weight arm.

In this context, the term "calibration weight arm" means any kind of receiving arrangement that is suitable to receive the calibration weight and to bring it in an appropriate way into contact with the load-receiving part of the weighing cell. This includes, e.g., a force-reduction lever which acts on the load-receiving part of the weighing cell through a coupling device, or which is coupled to a force-transmitting device or a force-transmitting linkage that may be part of the weighing cell. But also an arm or receiver element that is rigidly connected to the load-receiving part, or a position-defining seating area formed directly on the load-receiving part, is included in the understanding of the term "calibration weight arm" as used in the present context. The term "position-defining seating area" encompasses surfaces and geometrical shapes such as projections, recesses, bore holes and the like which together with the positioning means that have been chosen in a given case allow the calibration weight to be placed in a defined position relative to the load-receiving part in a plane that is orthogonal to the load direction.

It is also advantageous if the positioning means is configured in such a way, for example with a plurality of conically shaped portions, that the calibration weight can be used in weighing cells of different widths which have position-defining seating areas spaced differently in accordance with the widths of the cells.

Preferably, at least one transfer element is rigidly connected to the calibration weight base module in an arrangement wherein, as soon as the calibration weight is uncoupled from the calibration weight arm by the transfer mechanism, the transfer element is seated on a transfer seating area that is formed on the transfer mechanism lever. The transfer elements as well as the transfer seating areas have to be wear-resistant.

The calibration weight base module in an advantageous embodiment is made of stainless steel, which has favorable properties in regard to wear resistance, material exchange and corrosion resistance. However, other materials can also be used for the calibration weight base module, if the positioning elements and transfer elements have been made wear-resistant through a surface treatment or a surface coating, or by adding appropriate material parts to them, and if the surface of the calibration weight base module is protected by a surface treatment or surface coating against oxidation and/or moisture absorption.

The supplemental weights are designed preferably according to the criterion that they should fit in the most convenient way possible into the available space. The supplemental weights have to be designed in such a way that they can be attached by the fastening means through a force-locked, form-fitting, or materially bonded connection to the attachment areas of the calibration weight base module. Force-locked connections involve the transmission of forces, including for example compressive forces and friction forces. The integrity of the force-locked connection is ensured purely by the action of the force. Form-fitting connections are based on the mutual engagement of at least two connection partners. Due to the mechanical engagement, the connection partners cannot be separated from each other even when there is no force being transmitted or the force transmission has been interrupted. The term "materially bonded connections" refers to all connections in which the connection partners are held together by atomic or molecular forces.

To keep the volume of the supplemental weights small, one can use high-density materials of all kinds that are either sufficiently stable in maintaining their shape or can be kept in a stable shape by suitable means, for example by a container or by the fastening means of the calibration weight base module. Furthermore, the individual supplemental weights by themselves can consist of a plurality of components put together in a preassembled unit which is attached to the calibration weight base module only after the preassembly process has been completed.

Depending on the materials that are being used, it is necessary to protect the surfaces from moisture absorption and/or oxidation. Due to the installation of supplemental weights on the calibration weight base module, it is possible for crevices to form between narrowly adjacent surfaces, where liquids such as water from condensation can be absorbed and stored by capillary action. With suitable surface coatings, for example by immersion in a sealing agent, these crevices and capillaries of the assembled calibration weight can be eliminated. If the layer deposited as a surface coating has a sufficient strength of its own, this encapsulating layer can also serve as a fastening means in the sense of a materially bonded or form-fitting connection. The surface coating layer itself has to be leak-proof and non-hygroscopic.

In a particularly advantageous embodiment, the supplemental weights belonging to the calibration weight according to the invention have projections which allow larger surfaces to be spaced apart in order to avoid capillaries. The projections do not necessarily have to be formed on the supplemental weight but can also be arranged in the area of the fastening means, for example in the form of spacer sleeves. There can also be a plurality of supplemental weights attached in stacked layers to the calibration weight base module, provided that the location of use of the calibration weight is protected from the effects of moisture or provided that the spacing of the supplemental weights between each other and from the calibration weight base module is assured.

A special further developed embodiment of the modular calibration weight according to the invention is constituted by a so-called chain weight which is equipped with linear guiding constraints that allow limited relative movement in the load direction and are arranged between the calibration weight base module and/or adjacent supplemental weights. This concept allows a calibration in two or more load steps as the calibration weight is lowered, whereby a calibration sequence of the kind disclosed in Japanese patent application 01-152318 A is made possible. The linear guiding constraint is configured in such a way that it allows a sufficient amount of play while centering the partial weights relative to each other at their travel-delimiting stops, so that when the first step weight is set down, there is no friction in the linear guides which could cause a contact force and thereby have a negative influence on the correction value. Of course, each partial weight has to be equipped with corresponding transfer elements.

BRIEF DESCRIPTION OF THE DRAWINGS

Details of the modular calibration weight according to the invention may be learned from the description of the examples of embodiments that are illustrated in the drawings, wherein.

DETAILED DESCRIPTION OF A PREFERRED EMBODIMENT

Figure 1:
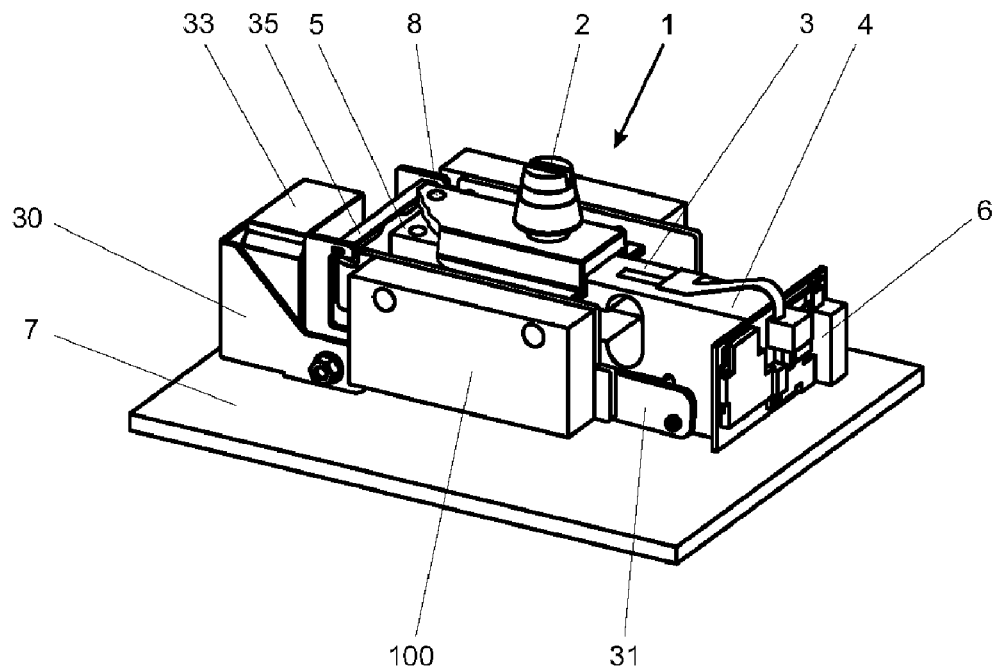
FIG. 1 is a perspective view of a gravimetric measuring instrument, in this case a balance, with a calibration weight according to the invention seated on the load-receiving part.

FIG. 1 shows the perspective representation of a gravimetric measuring instrument 1, in this case a balance, with the housing top taken off and not represented in the drawing. A weighing cell 3 is connected to a floor part 7 and held in a fixed position relative to the housing by way of a stationary part 4 formed at one end of the weighing cell 3. Formed at the other end of the weighing cell 3 is a load-receiving part 5 which is rigidly connected to a load receiver 2 by way of at least one connecting element 8. Also arranged on the stationary part 4 is a signal-processing module 6. In immediate proximity to the weighing cell 3, a transfer mechanism 30 is connected to the floor part 7. At the beginning of the calibration process, to initiate the calibration of the gravimetric measuring instrument 1, the drive source 33 of the transfer mechanism 30 couples a calibration weight 100 to the load-receiving part 5 of the weighing cell 3 by way of a transfer mechanism lever 31 and uncouples the calibration weight 100 again from the load-receiving part 5 of the weighing cell 3 at the end of the calibration process. In its uncoupled condition, the calibration weight 100 is pushed by the transfer mechanism lever 31 against a hold-down spring 35 in order to safeguard the calibration weight 100 from shocks and tremors during transport of the gravimetric measuring instrument.

Figure 2:
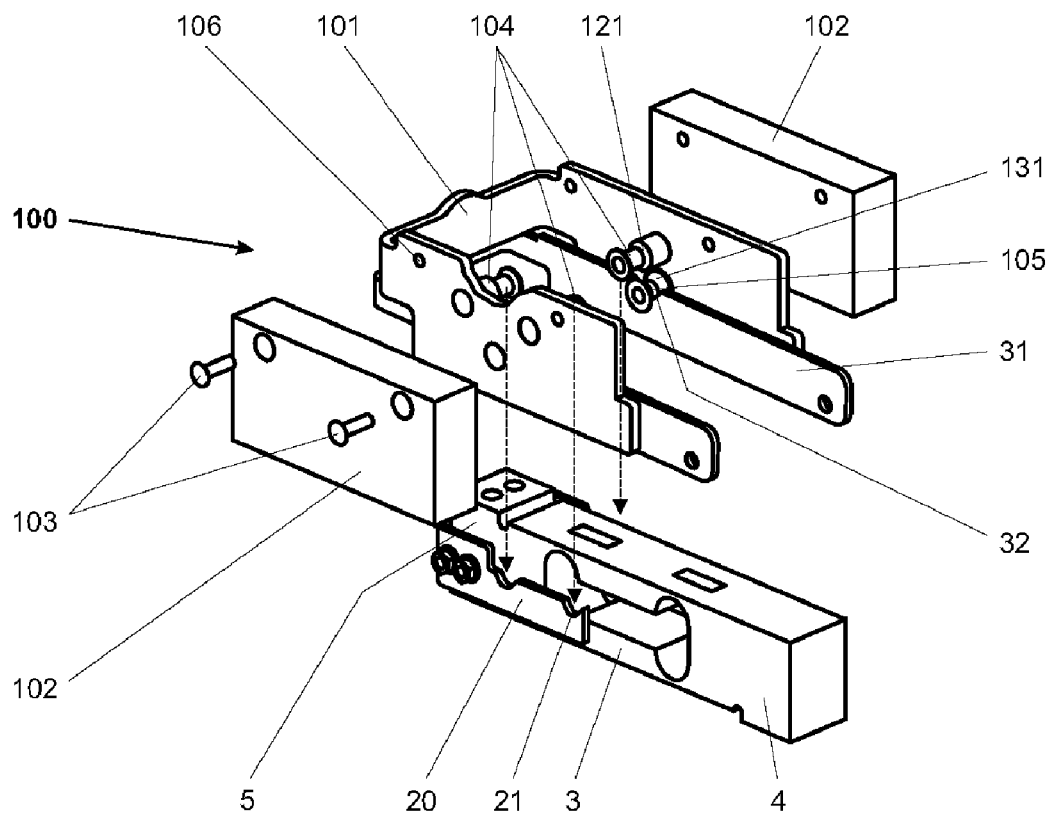
FIG. 2 is a perspective exploded view of a calibration weight according to the invention with a U-shaped calibration weight base module, supplemental weights, as well as the weighing cell with the calibration arm installed.

FIG. 2 shows an exploded view of a calibration weight 100 according to the invention in a perspective representation which also illustrates the transfer mechanism lever 31 and the weighing cell 3 with the stationary part 4 and the load-receiving part 5 drawn below the calibration weight 100. Rigidly connected to the load-receiving part 5 is a calibration weight arm 20 which has at least one position-defining seating area 21.

The calibration weight 100 has a U-shaped calibration weight base module 101 which has three positioning means 104 rigidly connected to it. When their conically tapered centering flanks 121 are seated on the position-defining seating areas 21 formed on the calibration weight arm 20, they ensure a play-free positioning of the calibration weight base module 101 in relation to the load-receiving part of the weighing cell 3. The two transfer elements 105 which are likewise arranged on the calibration weight base module 101 are resting through their conically tapered flanks 131 on the transfer seating areas 32 formed on the transfer mechanism lever 31 as soon as the calibration weight 100 is uncoupled from the calibration weight arm 20. By way of the fastening means 103 in the form of screws, two block-shaped supplemental weights 102 are screwed into the attachment areas 106 of the calibration weight base module 101 which are configured as tapped holes.

A calibration weight base module 101 equipped with positioning means 104 and transfer elements 105 has the advantage that it can be produced in large numbers for an entire model series of balances. This allows expensive production steps to be concentrated on a single part, analogous to the calibration weights disclosed in the prior art. But in contrast to the prior art, the single part is not limited in its application to a set calibration weight mass. The variation in the calibration weight mass for each balance 1 of a model series can be achieved by adding appropriate supplemental weights 102 whose design can be kept very simple. Relatively complicated shapes, as for example U-shaped calibration weights 100, can only now be produced at a justifiable cost by using a calibration weight base module 101.

Figure 3:
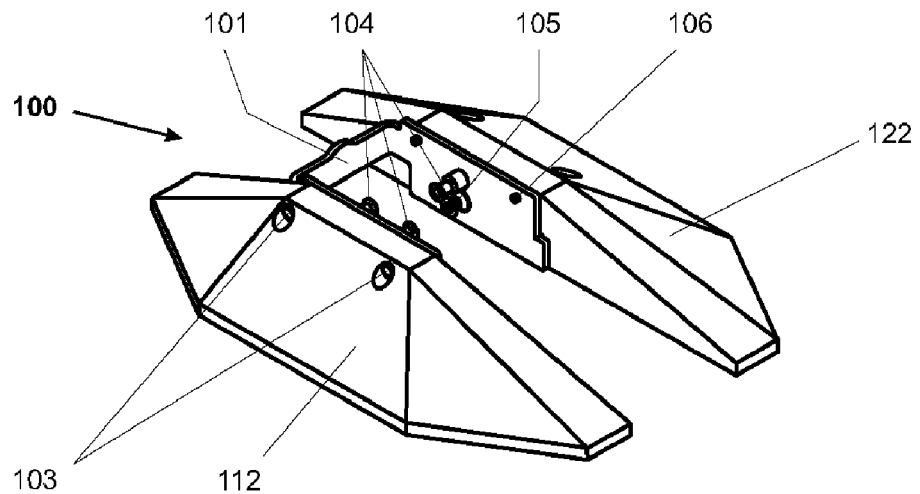
FIG. 3 is a perspective view of a calibration weight according to the invention with calibration weights adapted to conform to the internal contours of the balance housing.

FIG. 3 illustrates a perspective view of a calibration weight 100 whose calibration weight base module 101 is identical to the U-shaped calibration weight base module 101 described in FIG. 2. The calibration weight base module 101 for the calibration weight 100 of FIG. 3 is likewise equipped with the positioning means 104, the transfer means 105, and the attachment areas 106. Through the fastening means 103 in the form of screws, two supplemental weights 112, 122 whose shapes are matched to the internal contours of the balance housing are screwed to the attachment areas 106 configured as tapped holes in the calibration weight base module 101.

Figure 4:
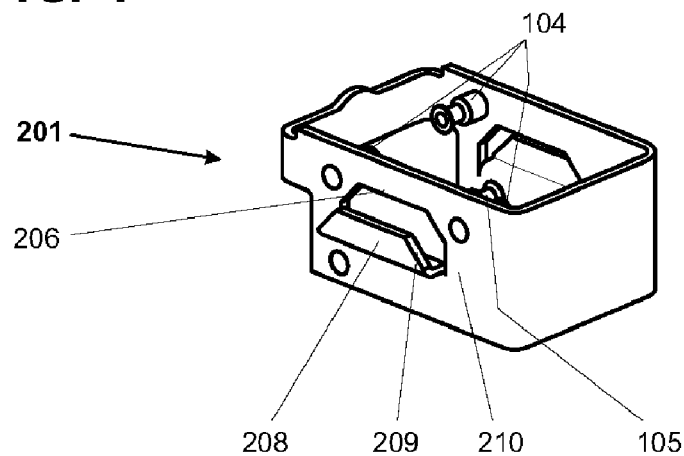
FIG. 4 is a perspective view of a ring-shaped calibration weight base module according to the invention.

FIG. 4 gives a perspective view of a ring-shaped calibration weight base module 201. It is likewise equipped with the positioning means 104 and the transfer elements 105 as shown in FIGS. 2 and 3. The attachment areas 206 are configured as holder brackets where the supplemental calibration weight (not shown) is clamped between a wall 210 of the calibration weight base module 201 and a tongue 208 or held in place by means of fastening means that are not shown in the drawing. With a suitable design of the supplemental weight, the flank 209 of the tongue can serve as a positioning aid for the installation of the supplemental weights on the calibration weight base module 201.

Figure 5:
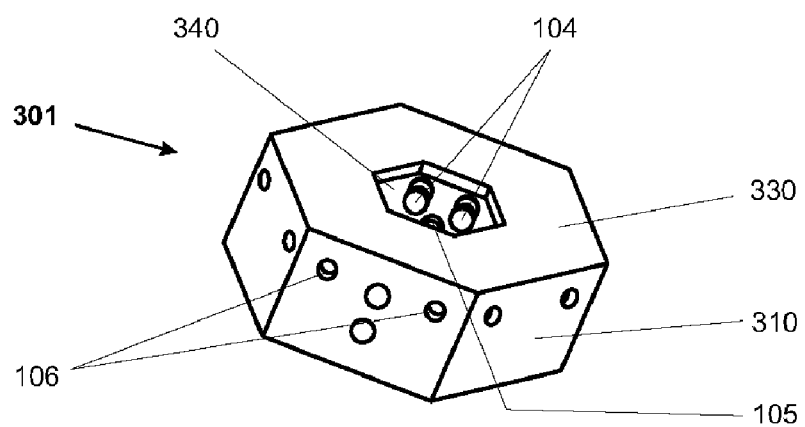
FIG. 5 is a perspective view of a cup-shaped calibration weight base module according to the invention.

FIG. 5 represents a perspective view of a calibration weight base module 301 according to the invention in the shape of a cup with a cup bottom 330. The calibration weight base module 301 which is shown here with a hexagonal perimeter wall 310 can also have more or fewer corners, or it can be designed with a round or oval shape. The cup bottom 330 has an opening 340 to allow a load receiver to pass through; but the cup bottom 330 can also be closed off if an opening 340 is not needed. Along the wall 310, attachment areas are formed in the form of holes for the attachment of supplemental weights. The calibration weight base module 301 is likewise equipped with positioning means 104 and transfer elements 105.

Figure 6:
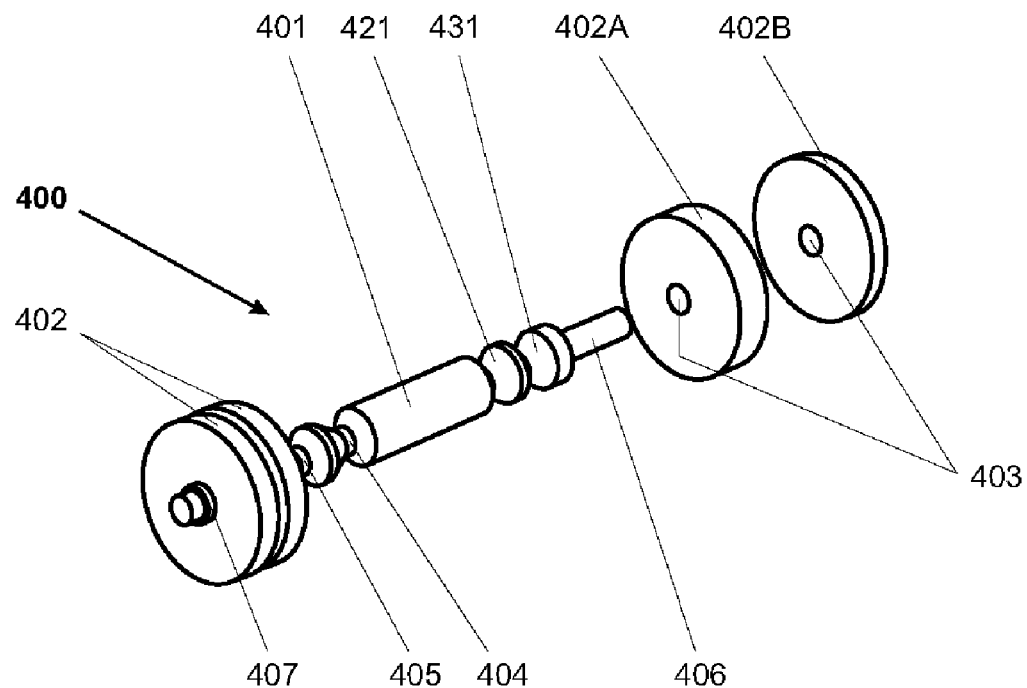
FIG. 6 is a perspective view of a calibration weight according to the invention with position-defining seating areas and transfer seating areas formed on a rod-shaped calibration weight base module.

FIG. 6 shows a perspective view of a calibration weight 400 according to the invention with positioning means 404 formed on the rod-shaped calibration weight base module 401 and with transfer elements 405. The positioning means 404 in the form of ring grooves are configured so that a centering flank 421 is formed; analogous to the centering flank 421, the transfer elements 405 are likewise equipped with a conically tapered flank 431. The rod-shaped calibration weight base module 401 is further equipped with attachment areas 406 in the form of stepped-down end sections of the rods for one or more supplemental weights 402. The supplemental weights 402 which are shown here in the form of disks can have any desired shape and cross-section and are equipped with fastening means 403 in the form of bore holes which are matched to the attachment areas 406. Ideally, the masses of the supplemental weights 402 follow a step pattern in the sense of a building block system, so that all load capacity ranges of a model series of balances can be represented with a small number of different supplemental weights 402A, 402B, . . . , etc. To avoid the formation of capillaries, the supplemental weights 402 have at least one projection 407 that keeps the supplemental weights spaced apart from each other.

Figure 7:
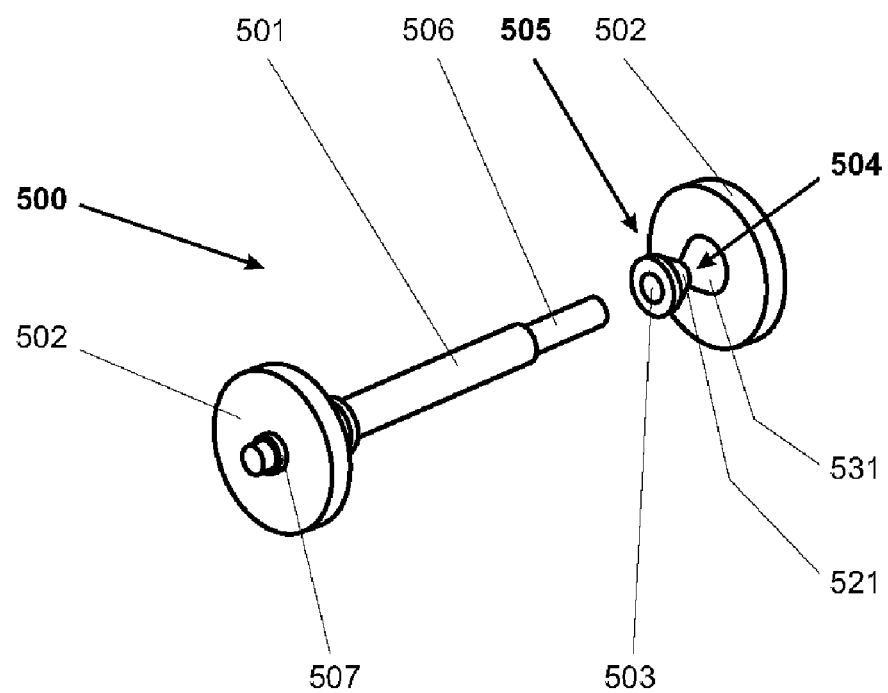
FIG. 7 is a perspective view of a calibration weight according to the invention with a rod-shaped calibration weight base module and with position-defining seating areas and transfer seating areas formed on the supplemental weight.

FIG. 7 shows a perspective view of a further calibration weight 500 according to the invention with a rod-shaped calibration weight base module 501. Deviating from the design shown in FIG. 6, only the attachment areas 506 are formed on the calibration weight base module 501, while the positioning means 504, the transfer elements 505 and the fastening means 503 are rigidly connected to the supplemental weight 502. It is also conceivable, for example, that only the transfer element 505 is formed on the supplemental weight 502 while the positioning means 504 are formed on the calibration weight base module 501. The positioning means 504 in the form of ring grooves are likewise configured in such a way that a centering flank 521 is formed. Analogously, the transfer elements 505 are likewise provided with a cone-shaped flank 531. The supplemental weight 502 has a projection 507.

FIGS. 1 and 2 show a weighing cell with strain gauges. It is considered self-evident that the calibration weight according to the invention can also be used in other gravimetric measuring instruments which operate according to different functional principles and require a calibration. This includes in particular balances with weighing cells that operate according to the principle of electromagnetic force compensation.

What is claimed is:

1. A gravimetric measuring instrument, comprising:
 a floor part, defining a footprint area of an interior space of the instrument;

a weighing cell having a load-receiving part and a stationary part, the weighing cell connected to and held in fixed position relative to the floor part, a height of the load-receiving part above the floor part defining a height of the interior space;

a calibration weight arm connected to the load receiving part;

a calibration weight, comprising:
   a calibration weight base module;
   at least one supplemental weight; and
   at least one attachment area formed on the calibration weight base module for attaching one of the supplemental weights thereto; and a transfer mechanism for coupling the calibration weight to the calibration weight arm and for uncoupling the calibration weight therefrom, the transfer mechanism connected to the floor part;

wherein the calibration weight base module and the supplemental weights are sized and shaped to conform to a remaining shape and volume of the interior space after placement of the weighing cell therein.

2. The calibration weight of claim 1, wherein the calibration weight base module comprises at least one means for positioning the calibration weight spatially relative to the calibration weight arm.

3. The calibration weight of claim 2, wherein: the positioning means comprises at least one centering flank which positions the calibration weight relative to at least one position-defining seating position formed on the calibration weight arm.

4. The calibration weight of claim 3, wherein: the calibration weight base module comprises at least one transfer element which cooperates with the transfer mechanism.

5. The calibration weight of claim 4, wherein the transfer element comprises at least one conically tapered flank which positions the calibration weight relative to at least one transfer seating area formed on the transfer mechanism.

6. The calibration weight of claim 5, wherein the calibration weight base module has a shape selected from the group consisting of: a rod, a "U", an "H", a "Y", a ring, and a cup.

7. The calibration weight of claim 4, wherein the positioning means and the transfer element have a wear-resistant surface.

8. The calibration weight of claim 7, wherein at least one position-defining seating area formed on the calibration weight arm and at least one transfer seating area formed on the transfer mechanism have a wear-resistant surface.

9. The calibration weight of claim 8, wherein at least one supplemental weight positioned on the calibration weight base module comprises a plurality of individual parts that are rigidly connected to each other.

10. The calibration weight of claim 8, wherein at least one supplemental weight positioned on the calibration weight base module comprises a plurality of individual components that are movable in the sense of a chain weight at least along a linear path in the load direction within a limited travel range.

11. The calibration weight of claim 8, wherein at least one supplemental weight positioned on the calibration weight base module has at least one projection that prevents crevices with a capillary effect from being formed, and wherein the least one projection keeps the supplemental weight spaced away from flat surfaces of the calibration weight base module and from the surfaces of any adjacent supplemental weights.

12. The calibration weight of claim 8, wherein an oxidation-resistant coating is provided on at least one of the calibration weight base module and the at least one supplemental weight.

13. The calibration weight of claim 8, wherein a surface coating for closing off crevices which could have a capillary effect is provided on at least one of the calibration weight base module and the at least one supplemental weight.

14. The calibration weight of claim 1, wherein the calibration weight base module comprises at least one transfer element which cooperates with the transfer mechanism.

15. The calibration weight of claim 14, wherein: the transfer element comprises at least one conically tapered flank which positions the calibration weight relative to at least one transfer seating area formed on the transfer mechanism.

16. The calibration weight of claim 1, wherein the calibration weight base module has a shape selected from the group consisting of: a rod, a "U", an "H", a "Y", a ring, and a cup.

17. The calibration weight of claim 4, wherein at least one position-defining seating area formed on the calibration weight arm and at least one transfer seating area formed on the transfer mechanism have a wear-resistant surface.

18. The calibration weight of claim 6, wherein at least one position-defining seating area formed on the calibration weight arm and at least one transfer seating area formed on the transfer mechanism have a wear-resistant surface.

19. The calibration weight of claim 1, wherein an oxidation-resistant coating is provided on at least one of the calibration weight base module and the at least one supplemental weight.

20. The calibration weight of claim 1, wherein a surface coating for closing off crevices which could have a capillary effect is provided on at least one of the calibration weight base module and the at least one supplemental weight.

* * * * *